US010500888B2

(12) United States Patent
Upton

(10) Patent No.: US 10,500,888 B2
(45) Date of Patent: Dec. 10, 2019

(54) METHOD OF RECYCLING GREETING CARDS AND A GREETING CARD

(71) Applicant: Tim Upton, Victoria (CA)

(72) Inventor: Tim Upton, Victoria (CA)

( * ) Notice: Subject to any disclaimer, the term of this patent is extended or adjusted under 35 U.S.C. 154(b) by 0 days.

(21) Appl. No.: 16/365,996

(22) Filed: Mar. 27, 2019

(65) Prior Publication Data

US 2019/0299697 A1 Oct. 3, 2019

(30) Foreign Application Priority Data

Mar. 28, 2018 (CA) ...................................... 2999571

(51) Int. Cl.
*B42D 15/04* (2006.01)
*G09F 1/02* (2006.01)
*G09F 1/04* (2006.01)

(52) U.S. Cl.
CPC ............. *B42D 15/045* (2013.01); *G09F 1/02* (2013.01); *G09F 1/04* (2013.01)

(58) Field of Classification Search
CPC .... B42D 15/045; B42D 15/042; B42D 15/02; G09F 1/02; G09F 1/04
See application file for complete search history.

(56) References Cited

U.S. PATENT DOCUMENTS

| 5,934,011 A * | 8/1999 | Ishioka | A01C 1/044 47/44 |
|---|---|---|---|
| 6,024,386 A * | 2/2000 | Spector | B42D 15/04 239/36 |
| 6,231,952 B1 * | 5/2001 | Lipper | B44C 1/1758 428/192 |
| 2002/0000064 A1 * | 1/2002 | D'Agnone | B42D 15/045 47/1.01 R |
| 2002/0011014 A1 * | 1/2002 | Lipper | B44C 1/1758 40/124.191 |
| 2002/0040670 A1 * | 4/2002 | Homak | A01C 1/044 111/114 |
| 2008/0245856 A1 * | 10/2008 | Jensen | B42D 15/0053 235/380 |
| 2011/0099867 A1 * | 5/2011 | Kuo | B42D 15/025 40/638 |
| 2014/0356597 A1 * | 12/2014 | Steward | D21H 13/20 428/211.1 |
| 2016/0135358 A1 * | 5/2016 | Seacord | A01C 1/044 47/56 |
| 2018/0044617 A1 * | 2/2018 | Kainen | C11D 17/0095 |
| 2019/0071855 A1 * | 3/2019 | Andrews | E03D 9/005 |
| 2019/0084336 A1 * | 3/2019 | Scholz | B42D 15/042 |

* cited by examiner

*Primary Examiner* — Gary C Hoge
(74) *Attorney, Agent, or Firm* — Davis & Bujold PLLC; Michael J. Bujold

(57) ABSTRACT

A method of recycling greeting cards. A first step involves making a greeting card body that dissolves when exposed to water leaving negligible residue. A second step involves incorporating in the greeting card body a substance that is released when the greeting card body dissolves is water. It is a desire to release the substance that provides a positive incentive for placing the greeting card body in the water.

13 Claims, 12 Drawing Sheets

FIG 1

HAPPY BIRTHDAY

10

METHOD OF RECYCLING GREETING CARDS AND A GREETING CARD

FIELD

There is described a method of recycling greeting cards and a greeting card that is suited for recycling in accordance with the method.

BACKGROUND

Information provided by the Greeting Card Association indicates that seven billion greeting cards are purchased every year having an annual retail sales value in excess of seven billion dollars. Nine out of every ten households buy greeting cards every year. The average household buys thirty greeting cards per year.

The recipient of a greeting card will retain the greeting card for a short time and then will dispose of it. As a result, billions of greeting cards end up in landfills every year. Where recycling programs are available, the used greeting cards may be recycled with other paper products.

SUMMARY

According to one aspect, there is provided a method of recycling greeting cards. A first step involves making a greeting card body that dissolves when exposed to water leaving negligible residue. A second step involves incorporating in the greeting card body a substance that is released when the greeting card body dissolves is water. It is a desire to release the substance that provides a positive incentive for placing the greeting card body in the water.

According to another aspect there is provided a greeting card which includes a greeting card body that dissolves when exposed to water leaving negligible residue. A substance is retained by the greeting card body. The substance is released as the greeting card body dissolves.

It is envisaged that by incorporating substances, such as aromatic oils or bath balm, into each greeting card body that an incentive will exist for recipients to take their greeting cards into the bath and let them dissolve.

BRIEF DESCRIPTION OF THE DRAWINGS

These and other features will become more apparent from the following description in which reference is made to the appended drawings, the drawings are for the purpose of illustration only and are not intended to be in any way limiting, wherein:

Figure 1:
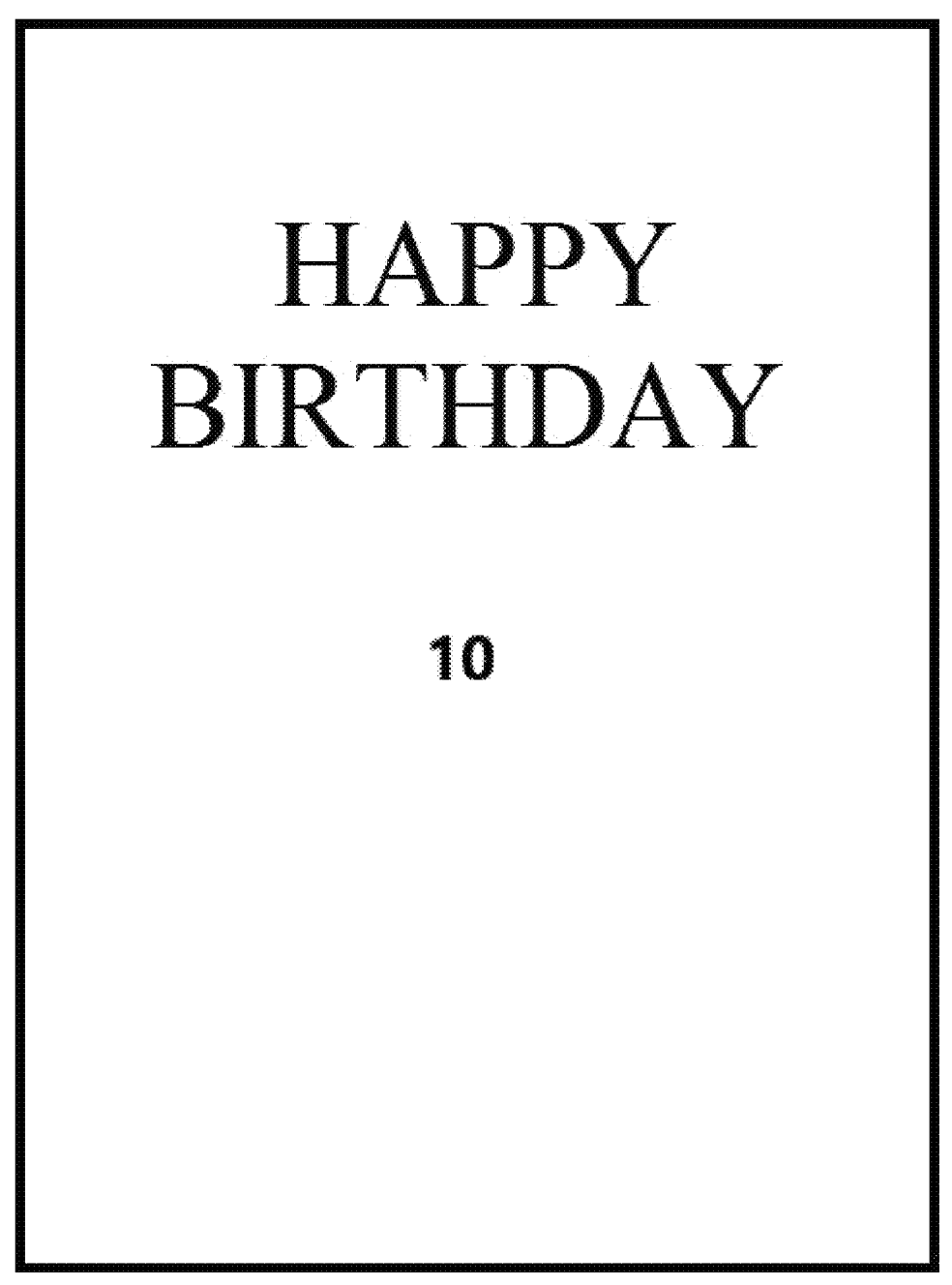

FIG. 1 is a perspective of the front view of a folder format hinged greeting card that is in the closed position showing the front page.

DETAILED DESCRIPTION

Figure 2:
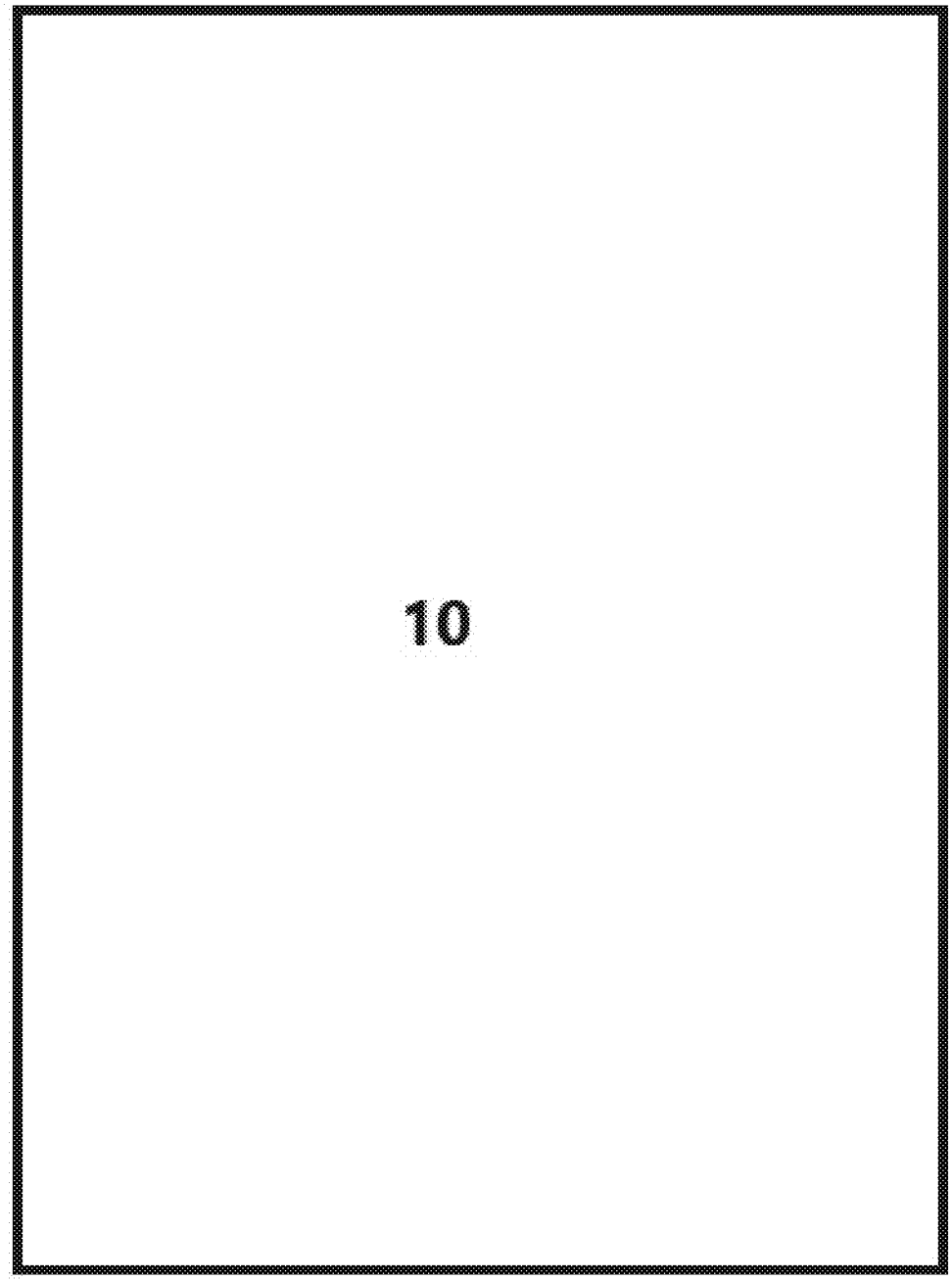
FIG. 2 is a perspective of the rear view of a folder format hinged greeting card that is in the closed position showing the rear page.
Figure 3:
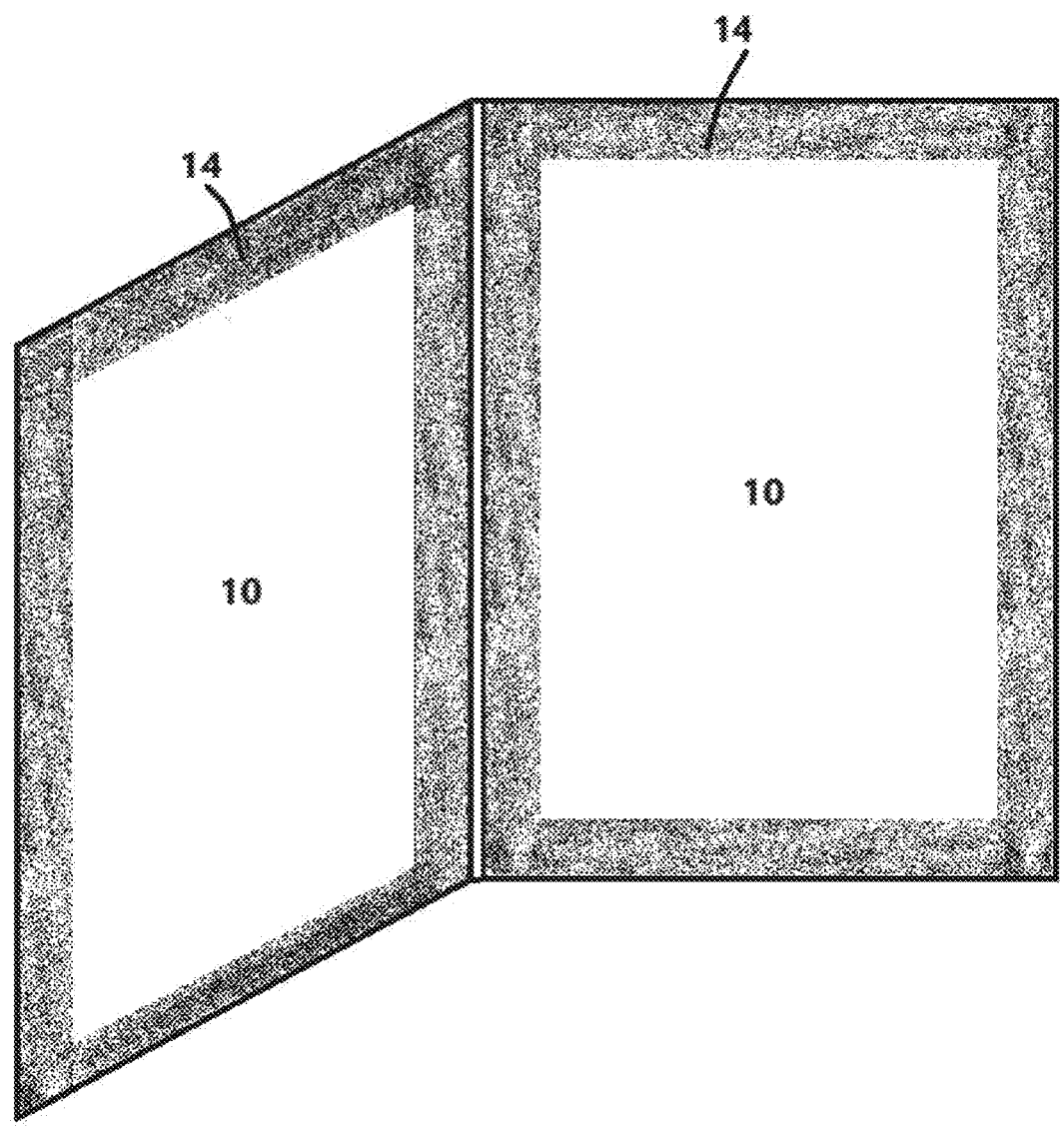
FIG. 3 is a tear-away view of the reverse side to the front water soluble paper that has a water soluble glue along the edges and the sides of the hinged line.
Figure 4:
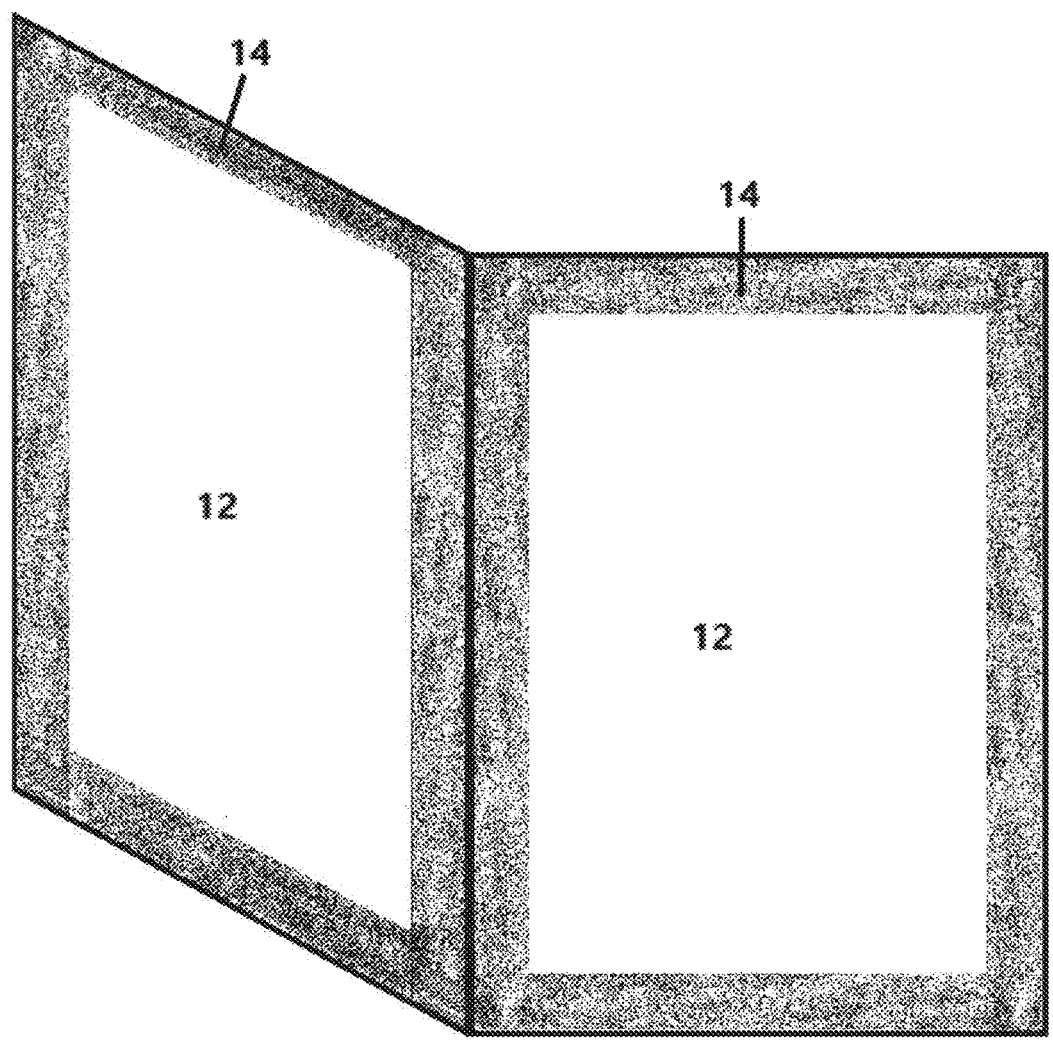
FIG. 4 is a tear-away view of the reverse side to the water soluble paper that can only be seen when the greeting card is in the opened position with water soluble glue along the edges and the sides of the hinged line.
Figure 5:
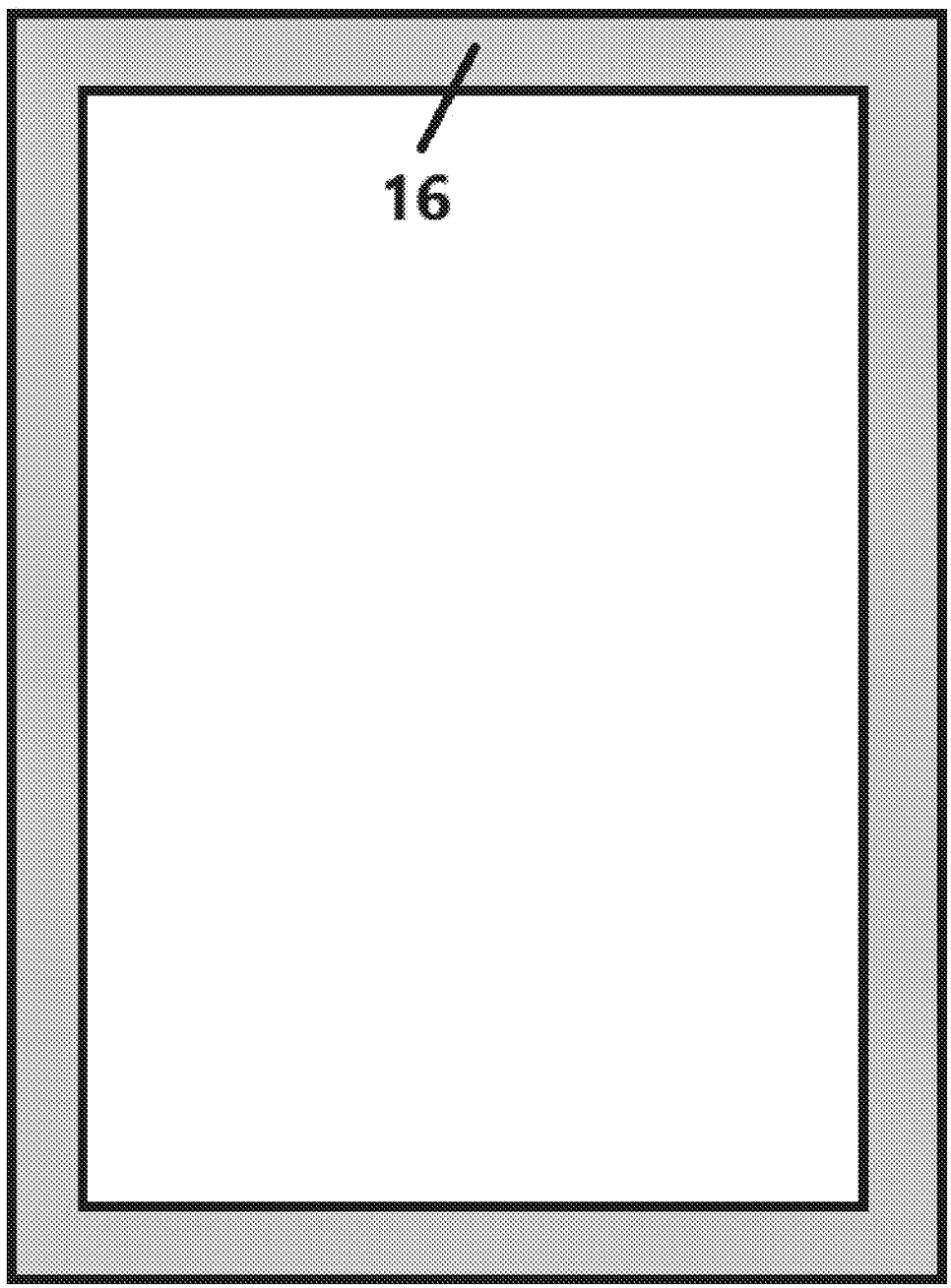
FIG. 5 is a water soluble paper edge spacer that can vary in thickness and is placed between the water soluble glue of the reverse side to the front water soluble paper and the reverse side to the water soluble paper that can only be seen when the greeting card is in the opened position. Two spacers are used, placed on each side of the hinged line.
Figure 6:
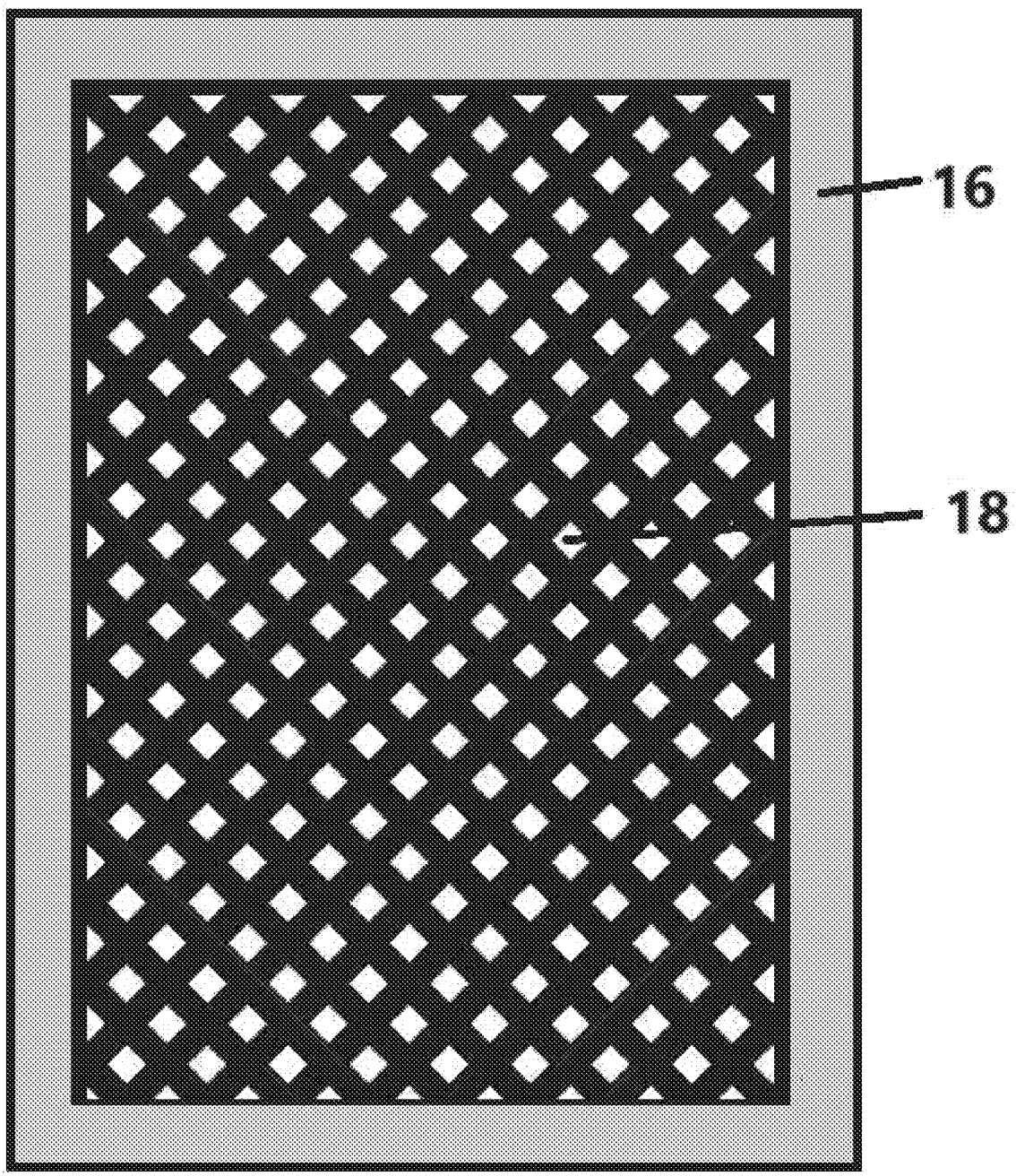
FIG. 6 is a tear-away view of the bath bomb (balm) insert material that will rest inside the water soluble paper edge spacer. Two insert materials are used, placed on each side of the hinged line inside the water soluble edge spacer.
Figure 7:
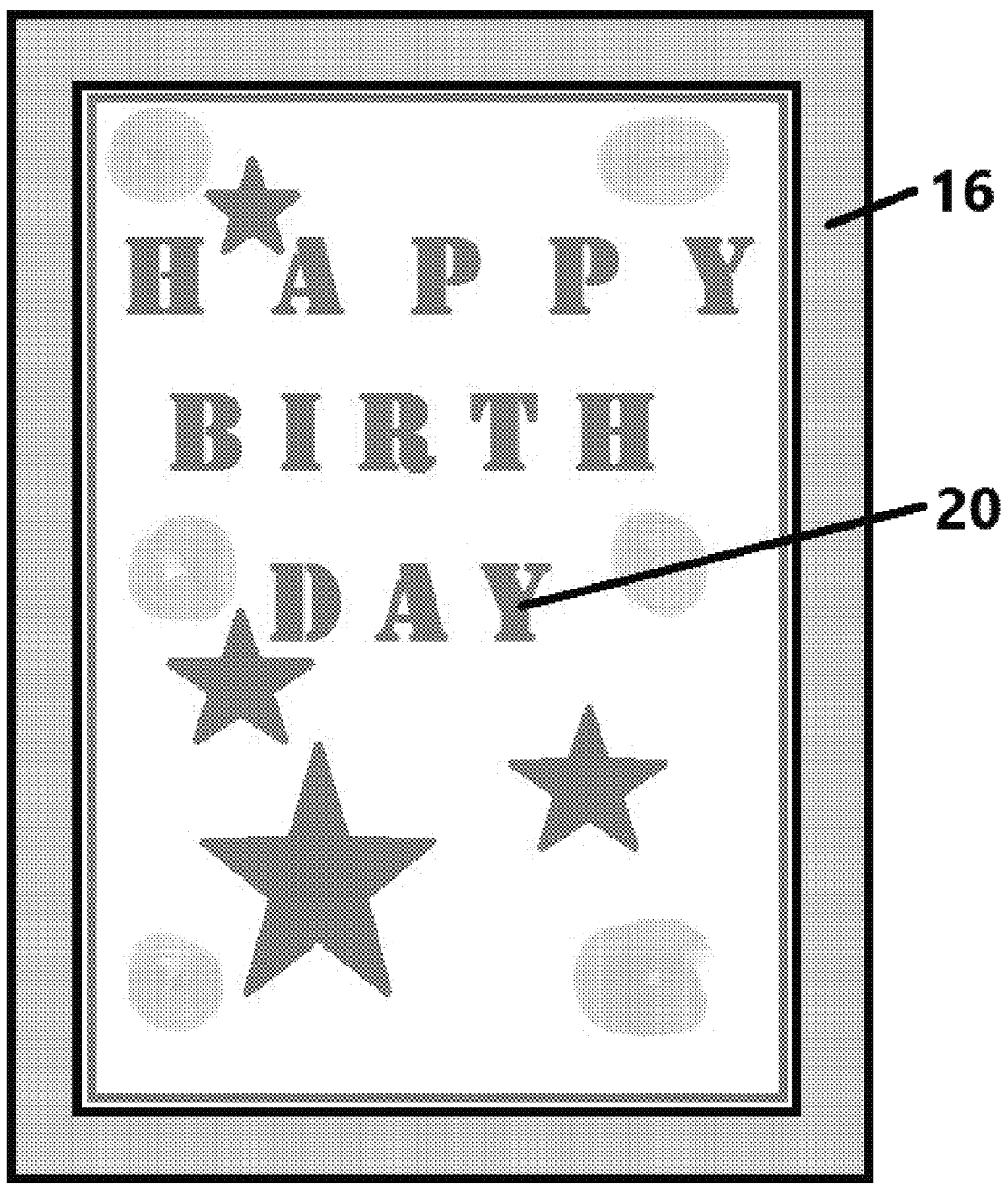
FIG. 7 is a tear-away view of another insert composing of water soluble paper confetti and scented oil, placed inside the water soluble paper edge spacer. Two insert materials are used, placed on each side of the hinged line inside the water soluble edge spacer.
Figure 8:
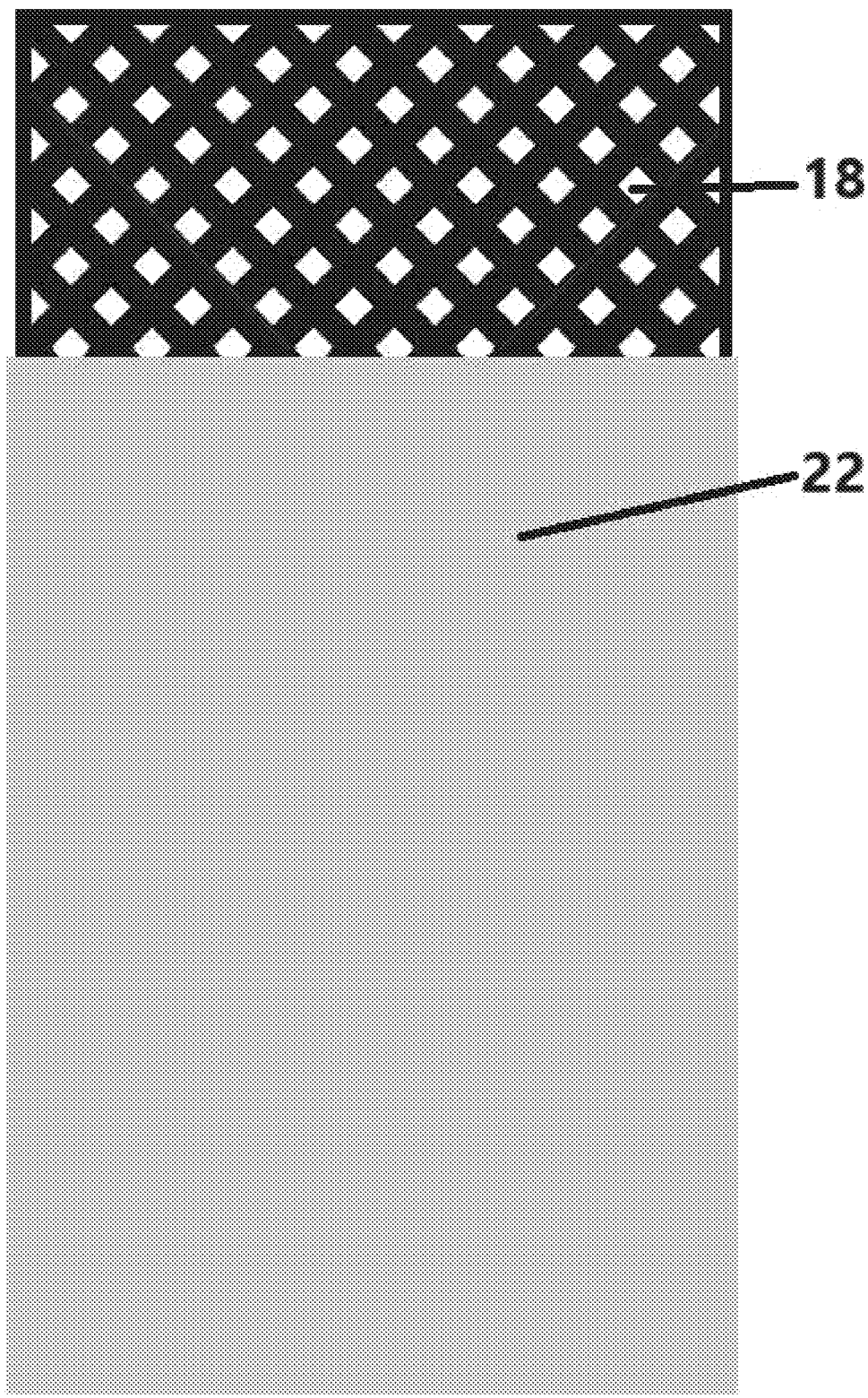
FIG. 8 is a tear-away view of the bath bomb (balm) insert material in action towards being placed inside a water soluble PVC bag.
Figure 9:
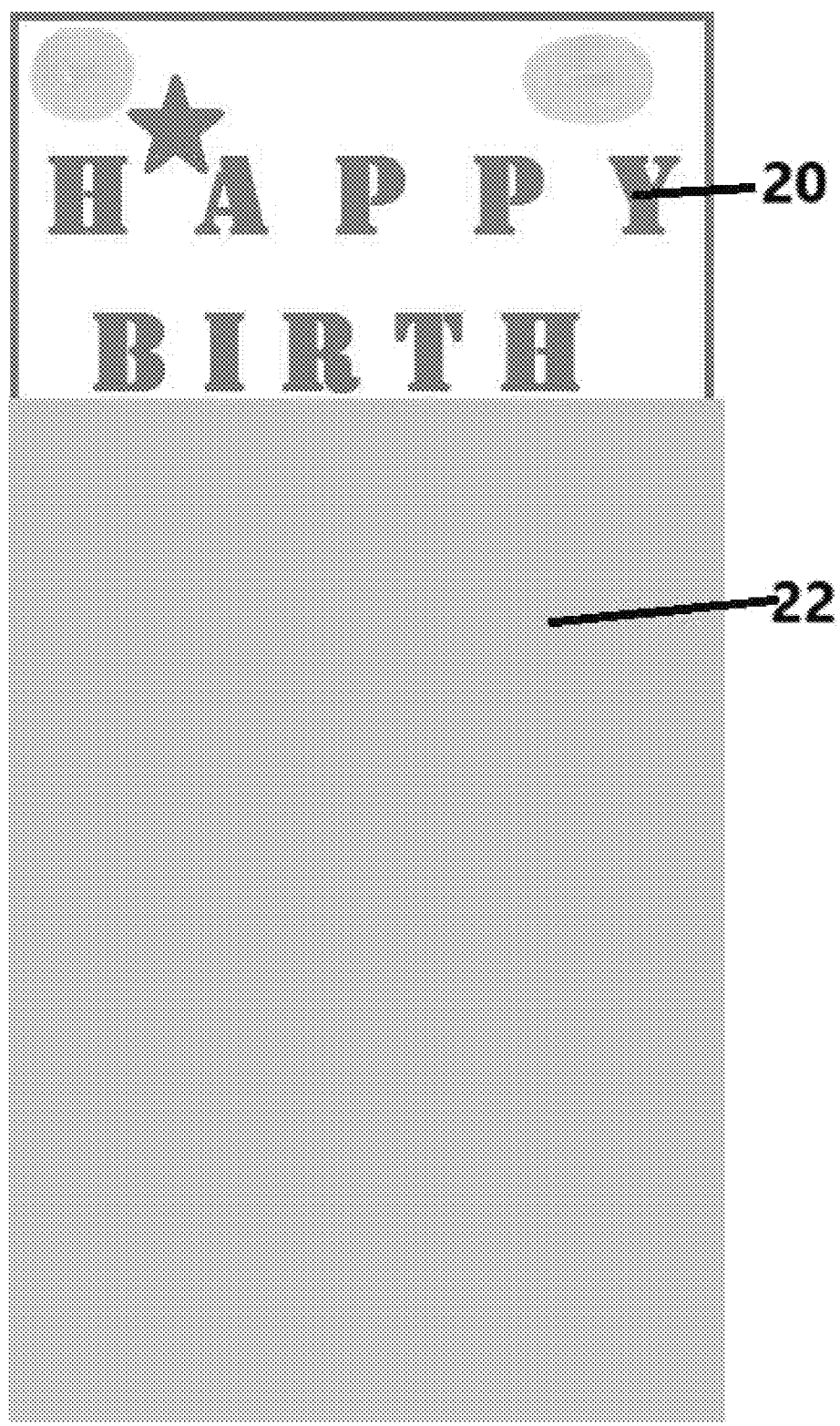
FIG. 9 is a tear-away view of the water soluble paper confetti and scented oil insert material in action towards being placed inside a water soluble PVC bag.
Figure 10:
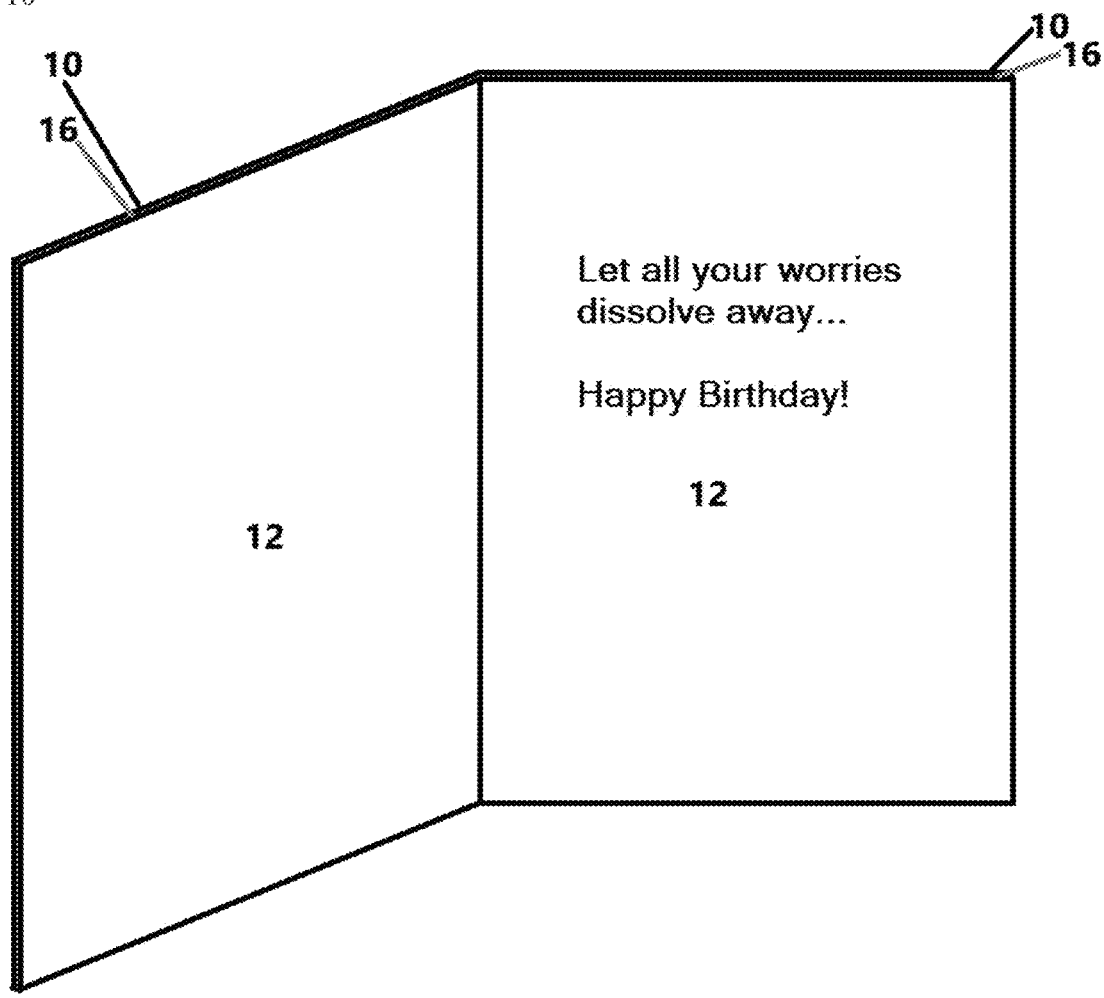
FIG. 10 is a perspective of the greeting card in the open position viewing inside the card, showing only along the edges the water soluble paper edge spacer between the two water soluble papers.

A greeting card will now be described with reference to FIG. 1 through FIG. 10. A commercial version of the greeting card will then be described in further detail with reference to FIG. 11 through FIG. 14.

Structure and Relationship of Parts:

Referring now to FIG. 1, there is a shown greeting card in a folder format card hinged in the centre to a closed position that is water soluble. A water soluble paper 10 is joined together to another water soluble paper 12 of the same rectangular size placed in parallel and hinged in the centre to create a folder format greeting card. A water soluble paper edge spacer 16 can be used in between both water soluble papers 10 and 12 to secure the internal material 18 and 20. To manufacture this folder type greeting card, one side of the water soluble paper 10 is covered with water soluble glue 14 along the outside edges of the largest side and along each side of the hinged line. A water soluble paper edge spacer 16, that can vary in thickness, is glued to the water soluble paper with the water soluble glue 14. Two spacers are used, one on each side, mirrored to the hinge line. A material insert 18 and 20 of water soluble PVC Bag 22 filled with bath bomb (balm) material 18 or a water soluble PVC bag 22 filled with a scented oil and water soluble paper pieces confetti 20 is then placed inside the water soluble paper edge spacer 16 on top of water soluble paper 10. Water soluble paper 12 of the same rectangular size is covered with a water soluble glue 14 along the same edges as water soluble paper 10 on the reverse large side and is placed against the two water soluble paper edge spacers 16. The greeting card can then be folded in half along the hinged line to create a closed folder format hinged greeting card. For this purpose be make of a sheet of heavy paper or paperboard stock thickness of water soluble paper 10 and 12 suitable to a greeting card to be inserted in an envelope addressed to the recipient of the card.

In practice, the greeting card may be of any type, such as a Christmas card in which the internal components could include water soluble paper 20 cut out in the shape of images or letters appropriate to this holiday.

In practice, the greeting card may require a thicker or not require an edge spacer 16 between water soluble paper 10 and water soluble paper 12.

Instead of a greeting card in a folder format, the card may take the form of a single rectangular tablet card.

Commercial Embodiment

Referring to FIG. 11 through FIG. 14, there will now be described a commercial version that was developed for sale to the public and is included to ensure that the best known mode is described.

Figure 11:
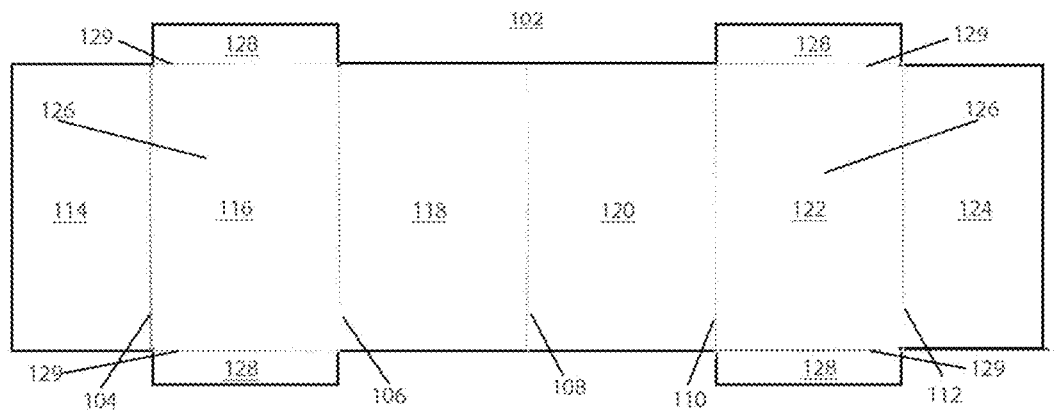
FIG. 11 is a top plan view of a greeting card blank prior to folding.

Referring to FIG. 11, there is shown a greeting card blank generally indicated by reference number 102. Greeting card blank 102 has five fold lines 104, 106, 108, 110, and 112, which divide greeting card blank 102 into six panels 114, 116, 118, 120, 122, and 124.

Figure 12:
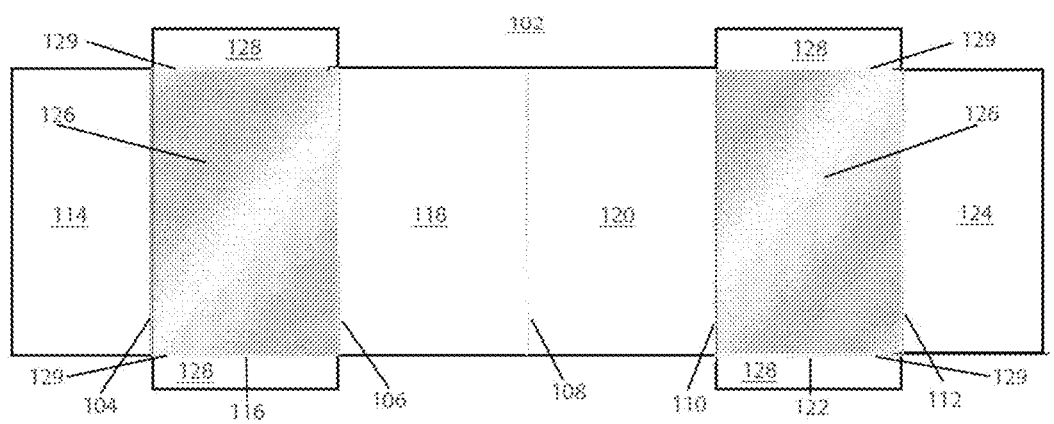
FIG. 12 is a top plan view of the greeting card blank of FIG. 11 with a slab of water soluble substance positioned prior to folding.

Referring to FIG. 12, the water soluble substance to be released is preformed into thin slabs 126. Slabs 126 are positioned on panels 116 and 122 prior to folding. It is preferred that slabs 126 be secured in place with a water soluble adhesive, as this simplifies assembly. The substance that is released can include bath salts, soaps, scents, colour, confetti, or glitter. They can be "enriched" by additives, such as vitamins. It will be understood that there are a variety of substances that can be used to make the bathing experience more memorable and enjoyable.

Referring to FIG. 11 and FIG. 12, panels 116 and 122 have attachment tabs 128, that are isolated by fold lines 129. As will hereinafter be described, when greeting card blank is folded; tabs 128 are used to folded over at fold lines 129 and secured with a non-toxic water soluble adhesive. In experimenting with non-toxic water soluble adhesives, corn syrup has been found to be an acceptable and cost effective adhesive.

Referring to FIG. 12, greeting card blank 102 is folded along fold line 104 to cause panel 114 overlie panel 116. Similarly, greeting card blank 102 is folded along fold line 112 to cause panel 124 to overlie panel 122. This first series of folds, results in greeting card blank 102 assuming the configuration illustrated in FIG. 13 with panel 114, slab 126 and panel 116 combined and secured with tabs 128 to form intermediate panel assembly 130 and panel 124, slab 126 and panel 122 combined and secured with tabs 128 to form intermediate panel assembly 132. This serves to lock slabs 126 in place.

Figure 13:
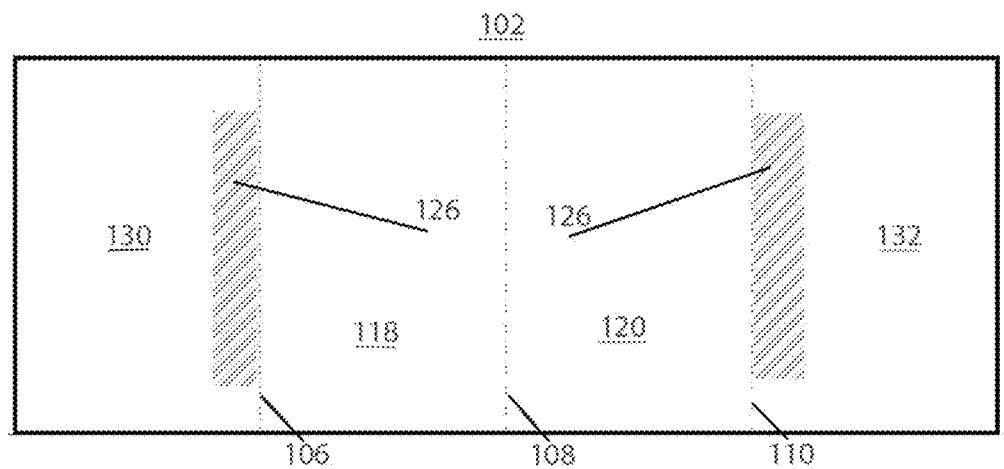
FIG. 13 is a top plan view of the greeting card blank of FIG. 12, after a first fold.
Figure 14:
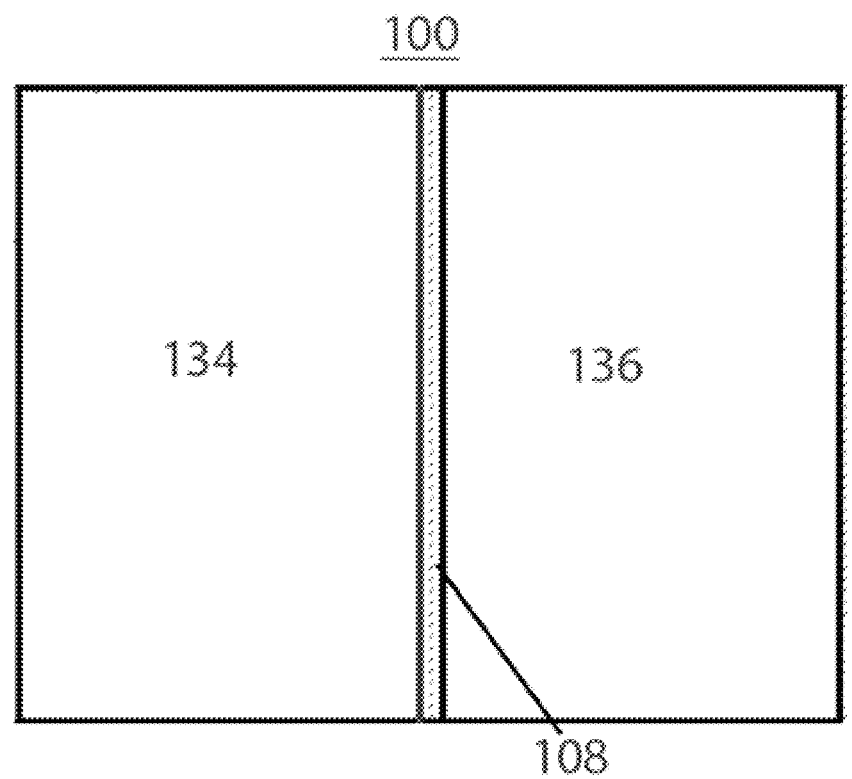
FIG. 14 is a top plan view of the greeting card blank of FIG. 13, after a second fold.

Referring to FIG. 13, greeting card blank 102 is then folded along fold line 106 to cause intermediate panel assembly 130 to overlie panel 118. Similarly, greeting card blank 102 is folded along fold line 110 to cause intermediate panel assembly 132 to overlie panel 120. This second series of folds, results in greeting card blank 102 assuming the configuration illustrated in FIG. 14 with intermediate panel assembly 130 and panel 118 combined and secured with tabs 128 to form a first final panel assembly 134 and intermediate panel assembly 132 and panel 120 combined and secured with tabs to form a second final panel assembly 136. Referring to FIG. 14, first final panel assembly 134 and second final panel assembly 136 are pivotally connected along fold line 108 and collectively form a greeting card, generally indicated by reference numeral 100.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A method of recycling greeting cards, the method comprising:
    making a greeting card body that dissolves when exposed to water;
    incorporating a substance, in the greeting card body, that is released when the greeting card body dissolves is water, such that a desire to release the substance provides a positive incentive for placing the greeting card body in the water, and
    the substance being encapsulated in a water soluble polyvinyl chloride bag.

2. A greeting card, comprising:
    a greeting card body that dissolves when exposed to water;
    a substance retained by the greeting card body, the substance being released as the greeting card body dissolves, and
    the substance being encapsulated in a water soluble polyvinyl chloride bag.

3. The greeting card of claim 2, wherein the greeting card body is made from a paper material that dissolves when exposed to water.

4. The greeting card of claim 2, wherein the greeting card body is made from a polymer material that dissolves when exposed to water.

5. The greeting card of claim 2, wherein the greeting card body is made from a combination of a paper material that dissolves when exposed to water and a polymer material that dissolves when exposed to water.

6. The greeting card of claim 2, wherein a message appropriate to the occasion is printed on the greeting card body with a non-toxic ink.

7. The greeting card of claim 2, wherein the substance is a bath balm.

8. The greeting card of claim 2, wherein the substance is sandwiched between water soluble paper.

9. The greeting card of claim 2, wherein the greeting card body is in a folded format having a front page and a back page, with an inside message readable only when the card is opened.

10. The greeting card of claim 2, wherein the greeting card body is in a tablet form.

11. The greeting card of claim 2, wherein the substance is formed into a slab.

12. The greeting card of claim 11, wherein the slab is secured to the greeting card body by a water soluble adhesive.

13. A greeting card comprising:
    a greeting card body that dissolve when exposed to water; and
    a substance retained by the greeting card body, and the substance being released as the greeting card body dissolves;

wherein the substance is a scented oil which produces an aroma.

* * * * *